United States Patent [19]

Sanada et al.

[11] Patent Number: 5,375,173
[45] Date of Patent: Dec. 20, 1994

[54] SPEAKER ADAPTED SPEECH RECOGNITION SYSTEM

[75] Inventors: Toru Sanada; Shinta Kimura, both of Kawasaki, Japan

[73] Assignee: Fujitsu Limited, Kawasaki, Japan

[21] Appl. No.: 921,215

[22] Filed: Jul. 29, 1992

[30] Foreign Application Priority Data

Aug. 8, 1991 [JP] Japan ............................. 3-198179

[51] Int. Cl.$^5$ .............................................. G10L 5/04
[52] U.S. Cl. ........................................ 381/43; 381/41
[58] Field of Search ................................. 381/43, 41

[56] References Cited

U.S. PATENT DOCUMENTS

| | | | |
|---|---|---|---|
| 4,363,102 | 12/1982 | Holmgren et al. | 381/42 |
| 5,131,043 | 7/1992 | Fujii et al. | 381/41 |
| 5,144,672 | 9/1992 | Kuriki | 381/41 |
| 5,175,793 | 12/1992 | Sakamoto et al. | 395/2 |

FOREIGN PATENT DOCUMENTS 1-291298 11/1989 Japan .

*Primary Examiner*—Allen R. MacDonald
*Assistant Examiner*—M. Sartori
*Attorney, Agent, or Firm*—Staas & Halsey

[57] ABSTRACT

A speaker adapted speech recognition system achieving a high recognition rate for an unknown speaker, comprises a plurality of acoustic templates of speakers for managing correspondence between an acoustic feature of the speech and a content of the speech, a converting portion for converting the acoustic feature of the speech managed by the acoustic templates according to a set parameter, a learning portion for learning the parameter, at which the acoustic feature of the acoustic template as converted by the converting portion is approximately coincidence with the acoustic feature of a corresponding speech input for learning when the speech input for learning is provided, a selection portion for selecting one or more of the acoustic templates having the closest acoustic features to that of a speech input for selection; the acoustic features of which are converted by the converting portion by comparing the corresponding acoustic feature of the speech input for selection with the corresponding acoustic features converted by the converting portion when the speech input for selection is provided, and an acoustic template for the unknown speaker is created by converting the acoustic features of the acoustic templates of the speakers that are selected by the selection portion, by the converter, for recognize the content of the speech input of the unknown speaker by using the created acoustic template of the speaker.

12 Claims, 10 Drawing Sheets

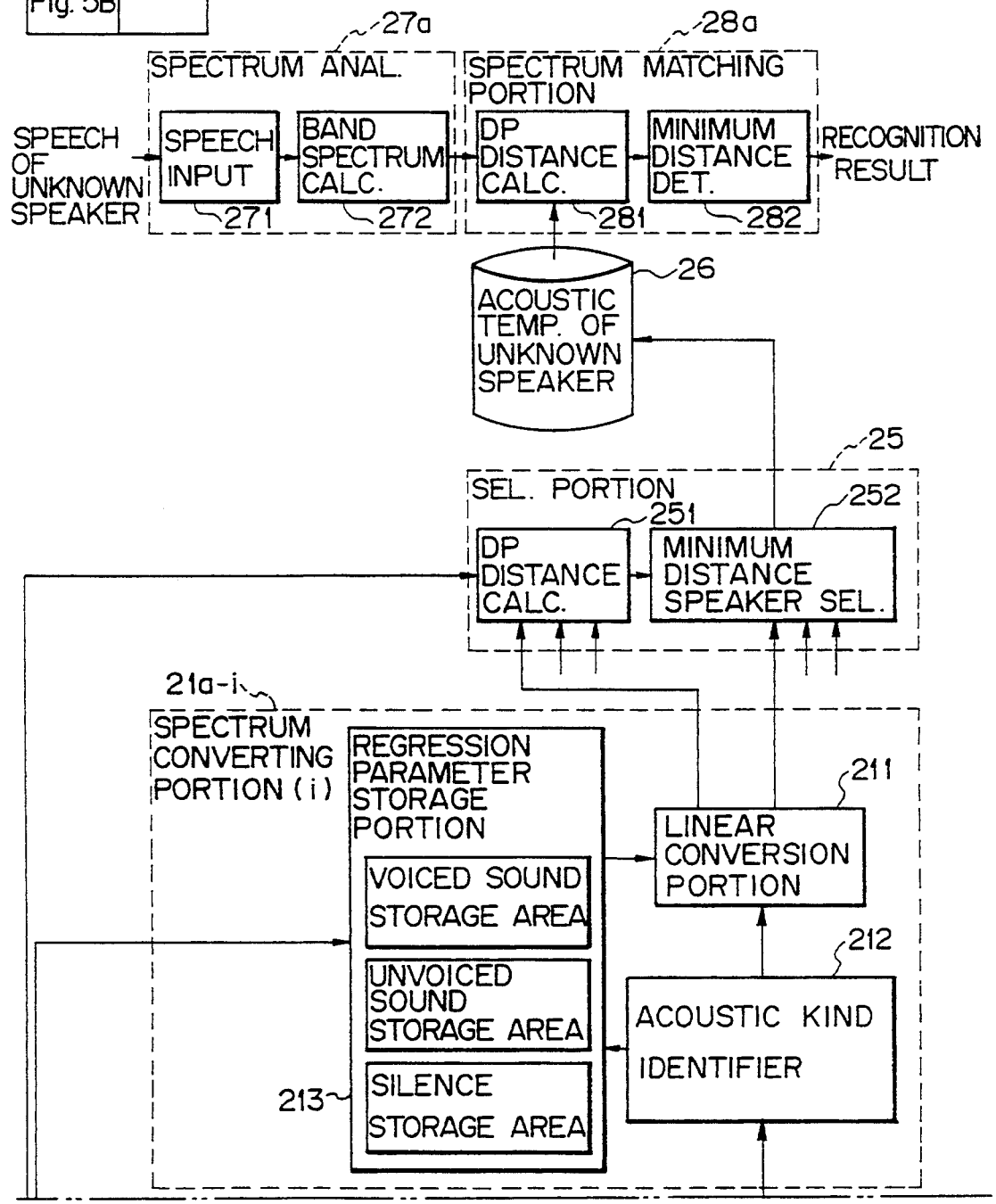

SPEAKER ADAPTED SPEECH RECOGNITION SYSTEM

BACKGROUND OF THE INVENTION

1. Field of the Invention

The present invention relates generally to a speaker adapted speech recognition system for recognizing an unknown speaker. More specifically, the invention relates to a speaker adapted speech recognition system that can realize a high recognition rate.

2. Description of the Related Art

A speech recognition system is typically adapted to manage correspondence between a spectral pattern of speech and the content of speech in order to implement speech recognition, by identifying the contents of speech represented by the spectral patterns of the speech when speech is input. With such a construction, it is possible to implement the system for speech recognition for speaker dependent speech recognition. However, at present, the systems for recognizing speakers independent speech recognition are not practically useful because of a low recognition rate. Recently, a speaker adapted speech recognition system that is adapted to modify management data of the correspondence between the spectral pattern and the content of speech depending upon the unknown speaker in order to implement speech recognition of speakers independent speech recognition, has been developed. In such a speaker adapted speech recognition system, it is necessary to make it possible to modify the management data of the correspondence between the spectral pattern and the content of the speech of the unknown speaker.

In one of the typical prior art approaches, a plurality of data of mutually different speakers are stored as acoustic templates of the speakers. When the speech input is given by the unknown speaker, the spectral pattern of the speech of the unknown speaker is checked against the acoustic templates for selecting one of the templates having the closest spectral pattern for speech recognition.

In such a case, a sufficient number of variations of the spectral patterns have to be preliminarily stored for achieving a satisfactorily high recognition rate. This clearly requires a large memory capacity for storing a large number of the acoustic templates of the speakers.

In another approach, a sole standard acoustic template is provided. The management data of the standard acoustic template is modified for adapting the spectral pattern thereof to the speech input to be recognized and enhancing the recognition rate. For this purpose, a neural network is employed for learning an association factor between neurons so as to achieve an adaptive modification of the management data.

Even in the latter approach, in order to cover a variety of the speech characteristics of the speech inputs, it is necessary to have a neural network of sufficient size. This, in turn, requires substantial learning capacity to enable the neural network to appropriately determine the modification of the management data and achieve a satisfactory recognition rate.

The documents regarding the prior art are, for example as follows:

1. Japanese Unexamined Patent Publication (Kokai) No. 59-180596
2. Japanese Unexamined Patent Publication (Kokai) No. 01-291298

SUMMARY OF THE INVENTION

In view of the drawbacks in the prior art, it is an object of the present invention to provide a novel speaker adapted speech recognition system that can attain a high recognition rate.

In order to accomplish the above-mentioned objects, a speaker adapted speech recognition system, according to the present invention, for recognizing the speech of an unknown speaker, comprises a plurality of acoustic templates of speakers for managing correspondence between an acoustic feature of the speech and a content of the speech;

a converting portion for converting the acoustic feature of the speech managed by the acoustic templates according to a set parameter;

a learning portion for learning the parameter at which the acoustic feature of the acoustic template, as converted by the converting portion, is approximately coincidence with the acoustic feature of a corresponding speech input for learning, when the speech input for learning is provided;

a selection portion for selecting one or more of the acoustic templates having the closest acoustic features to that of a speech input for selection; the acoustic features being converted by the converting portion by comparing the corresponding acoustic feature of the speech input for selection with the corresponding acoustic features converted by the converting portion, when the speech input for selection is provided; and an acoustic template for the unknown speaker being created by converting the acoustic features of the acoustic templates of the speakers that are selected by the selection portion, by the converter, for performing recognition of the content of speech of the speech input of the unknown speaker by using the created acoustic template of the speaker.

In the construction set forth above, the converting portion may perform a converting process according to parameters set with respect to the attributes of the speech, and the learning portion may be adapted to learn the parameters for the respective attributes of the speech set by the converting portion. As an alternative, the converting portion may perform a linear conversion, and the learning portion may perform learning of the parameters of the linear converting process according to a linear regression analysis. In either case, the converting portion may have basic units as basic components, receiving one or more inputs and an internal value to be multiplied with the inputs to derive the multiplication and addition value, converting the multiplication and addition value with a defined function to derive a final output; the basic units being connected through a network connection to perform a conversion process with the internal value as the parameter, and the learning portion may perform a process for learning the internal value.

It is also possible that the speech input for learning is used as the speech input for selection.

BRIEF DESCRIPTION OF THE DRAWINGS

The present invention will be more fully understood from the detailed description given herebelow and from the accompanying drawings of the preferred embodiment of the invention, which, however, should not be considered limitative to the invention, but are for explanation and understanding only.

In the drawings:

FIG. 4 comprising

FIG. 5 comprising FIG. 5A and FIG. 5B, is a block diagram of another embodiment of a speaker adapted speech recognition system according to the present invention;

FIG. 6 comprising

DESCRIPTION OF THE PREFERRED EMBODIMENT

Figure 1:
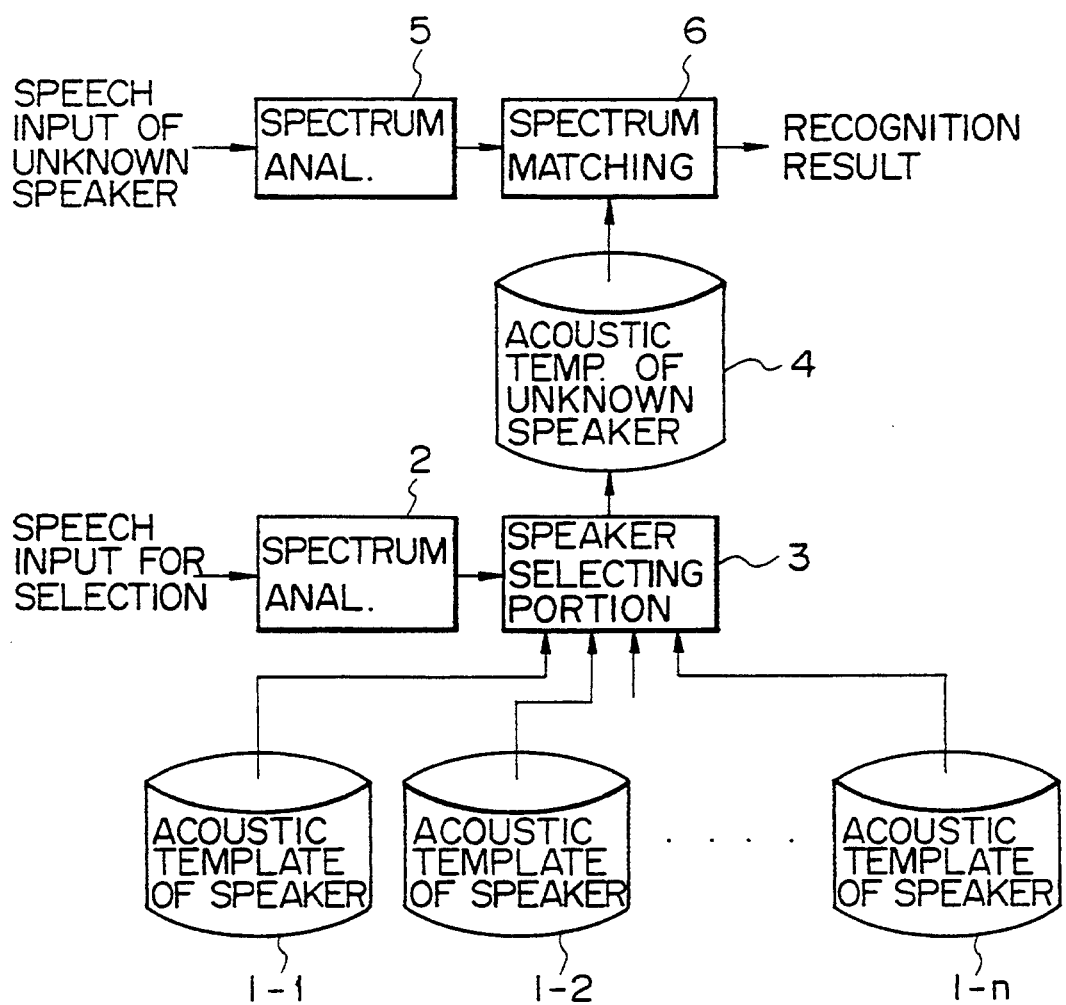
FIG. 1 is a schematic block diagram of the conventional speaker adapted speech recognition system.
Figure 2:
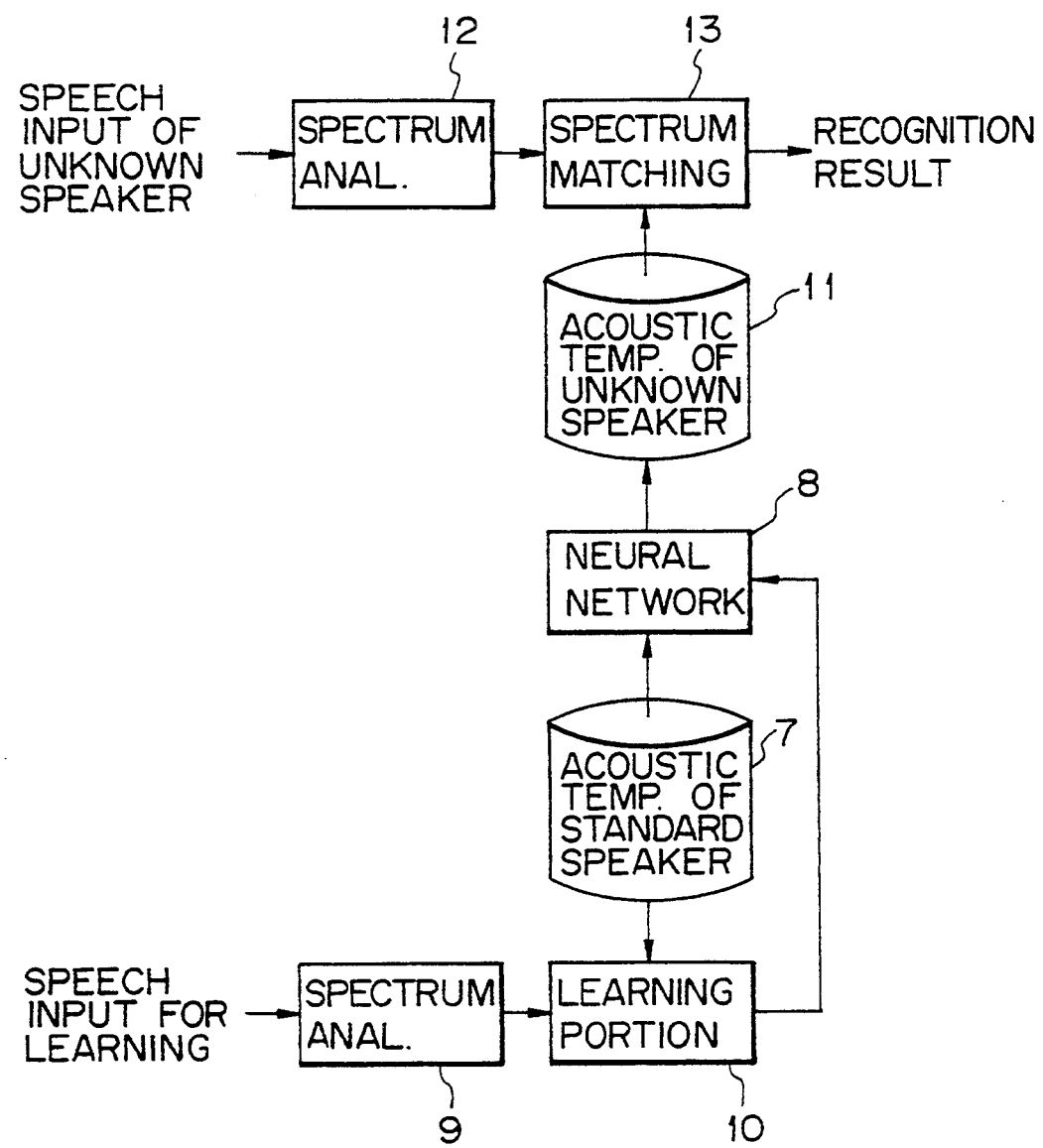
FIG. 2 is a schematic block diagram of another conventional speaker adapted speech recognition system.

In advance of the discussion for the preferred embodiment of a speaker adapted speech recognition system according to the present invention, a brief description will be provided for the prior art in order to facilitate a better understanding of the invention. FIGS. 1 and 2 show the construction of the conventional speaker adapted speech recognition systems.

In FIG. 1, elements 1-$i$ ($i=1$ to n) denote a plurality of acoustic templates of speakers for managing correspondence of spectral patterns of respective speakers and the contents of speech. Element 2 denotes a spectrum analyzing portion (SPECTRUM ANAL.) for deriving a spectral pattern of a speech input for selection when the selection speech input by an unknown speaker is provided. Element 3 denotes a speaker selecting portion for deriving a similarity between the spectral pattern derived by the spectrum analyzing portion 2 and spectral patterns stored in the acoustic templates 1-$i$ of the speakers and thus selecting one of the acoustic templates 1-$i$ having the greatest similarity to the spectral pattern of the speech input for selection. Element 4 denotes an acoustic template for an unknown speaker (ACOUSTRIC TEMP. OF UNKNOWN SPEAKER) and adapted to store management data for the unknown speaker as the acoustic template 1-$i$ selected by the speaker selecting portion 3. Element 5 is a spectrum analyzing portion (SPECTRUM ANAL.) for deriving a spectral pattern of the speech input of the unknown speaker when the speech of the unknown speaker is provided. Element 6 denotes a spectrum matching portion (SPECTRUM MATCHING) for matching spectral patterns derived by the spectrum analyzing portion 5 and the spectral patterns stored in the acoustic template 4 of the unknown speaker and thus for recognizing the content of the speech of the speech input of the unknown speaker.

In the prior art of FIG. 1, which is constructed as set forth above, the unknown speaker initially inputs the speech for selection to the spectrum analyzing portion 2. Once the selection speech input is thus provided, the spectrum analyzing portion 2 derives the spectral pattern of the corresponding speech input for selection. In response to this deriving process, the speaker selecting portion 3 selects the derived spectral pattern and the stored acoustic templates of the speakers that is closest to the spectral pattern of the speech input for selection by deriving a similarity to the spectral patterns stored in the acoustic templates 1-$i$. The management data of the selected acoustic template 1 -$i$ is stored in the acoustic template 4 of the unknown speaker.

Next, the unknown speaker inputs vocabulary to the spectrum analyzing portion 5. Once, the speech input of the unknown speaker is thus given, the spectrum analyzing portion 5 derives the spectral pattern of the speech input of the unknown speaker. In response to this derivation process, the spectrum matching portion 6 matches the derived spectral pattern and the spectral pattern stored in the acoustic template 4 of the unknown speaker in order to recognize the content of the speech input of the unknown speaker.

As set forth above, in the prior art of FIG. 1, a plurality of acoustic templates of mutually different plurality of speakers for dependent speech recognition are prepared and by selecting the acoustic template 1-$i$ closest to the unknown speaker, the speech recognition for speakers independent speech recognition is performed in an adaptive manner.

On the other hand, in FIG. 2, Element 7 denotes an standard acoustic template of a standard speaker that manages the correspondence between the spectral pattern of the speech of the standard speaker and the content of the speech. Element 8 denotes a neural network formed by network connection of a neuron for implementing a predetermined data conversion process according to an association factor set between neurons, and thus modifying the spectral pattern managed by the acoustic template 7 of the standard speaker. Element 9 denotes a spectrum analyzing portion (SPECTRUM ANAL.) for deriving a spectral pattern of a speech input to learn when the speech input for learning is provided. Element 10 denotes a learning portion for learning the association factor set between the neuron units of the neural network 8 to set the association factor that enables the neural network 8 to output the spectral pattern corresponding to that derived by the spectrum analyzing portion 9 when the spectral pattern managed by the acoustic template 7 of the standard speaker is input to the neural network 8. Element 11 denotes an acoustic template of the unknown speaker for storing management data of the acoustic template 7 of the standard speaker converted by the neural network 8, as the template of the unknown speaker. Element 12 denotes a spectrum analyzing portion for deriving the spectral pattern of the speech input of the unknown speaker when the speech input of the unknown speaker is provided. Element 13 denotes a spectrum matching portion (SPECTRUM MATCHING) for checking the matching of the spectral pattern derived by the spectrum analyzing section 12 and the spectral pattern stored in the acoustic template 11 of the unknown speaker and thus to recognize the content of the speech of the speech input of the unknown speaker.

In the prior art of FIG. 2, which is constructed as set forth above, the unknown speaker initially inputs the speech input for learning to the spectrum analyzing portion 9. As mentioned above, when the speech input for learning is provided, the spectrum analyzing portion 9 derives the spectral pattern of the speech input for learning. Upon receiving the deriving process, the learning portion 10 studies the association factor set between the neuron of the neural network 8 in accordance with the learning algorithms, for example, a back propagation method or the like. Upon receiving the learning process, the neural network 8 forms the acoustic template 11 of an unknown speaker by converting the spectral pattern managed by the acoustic template 7 of the standard speaker.

Next, the unknown speaker inputs vocabulary to the spectrum analyzing portion 12. When the speech input of the unknown speaker is thus provided, the spectrum analyzing portion 12 derives the spectral pattern of the speech input of the unknown speaker. In response to a derivation process, the spectrum matching portion 13 checks the matching of the derived spectral pattern and the spectral pattern stored in the template 11 of the unknown speaker to recognize the content of the speech input of the unknown speaker.

As set forth above, in the prior art of FIG. 2, the sole template 7 of the standard speaker is prepared. Also, the neural network 8 for converting the management data of the template 7 of the standard speaker and the learning portion 10 for studying speech input to learn the data converting function of the neural network 8 are provided, and the management data of the template 7 of the standard speaker is converted to have characteristics close to the speech characteristics of the unknown speaker to implement adaptive speech recognition of the speaker independent of speech recognition.

However, in the prior art illustrated in FIG. 1, when the unknown speaker has speech characteristics that are not expected in the acoustic template $1-i$ of the speakers, a problem arises in that a sufficient recognition rate cannot be attained. In order to solve this problem, one approach may be to increase the number of acoustic templates $1-i$ to be prepared. In this case, a substantially large memory capacity becomes necessary and thus makes the system impractical.

On the other hand, in the prior art of FIG. 2, although the template 11 for the unknown speaker adapted to the speech characteristics of the unknown speaker can be prepared by the data converting function of the neural network 8, when the unknown speaker has speech characteristics that cannot be covered even by the data converting function of the neural network 8, an insufficient recognition rate may occur. As a solution for this problem, it may be possible to expand the network scale of the neural network, and it becomes necessary to learn a large amount of the speech input to learn the association factor between neurons.

Figure 3:
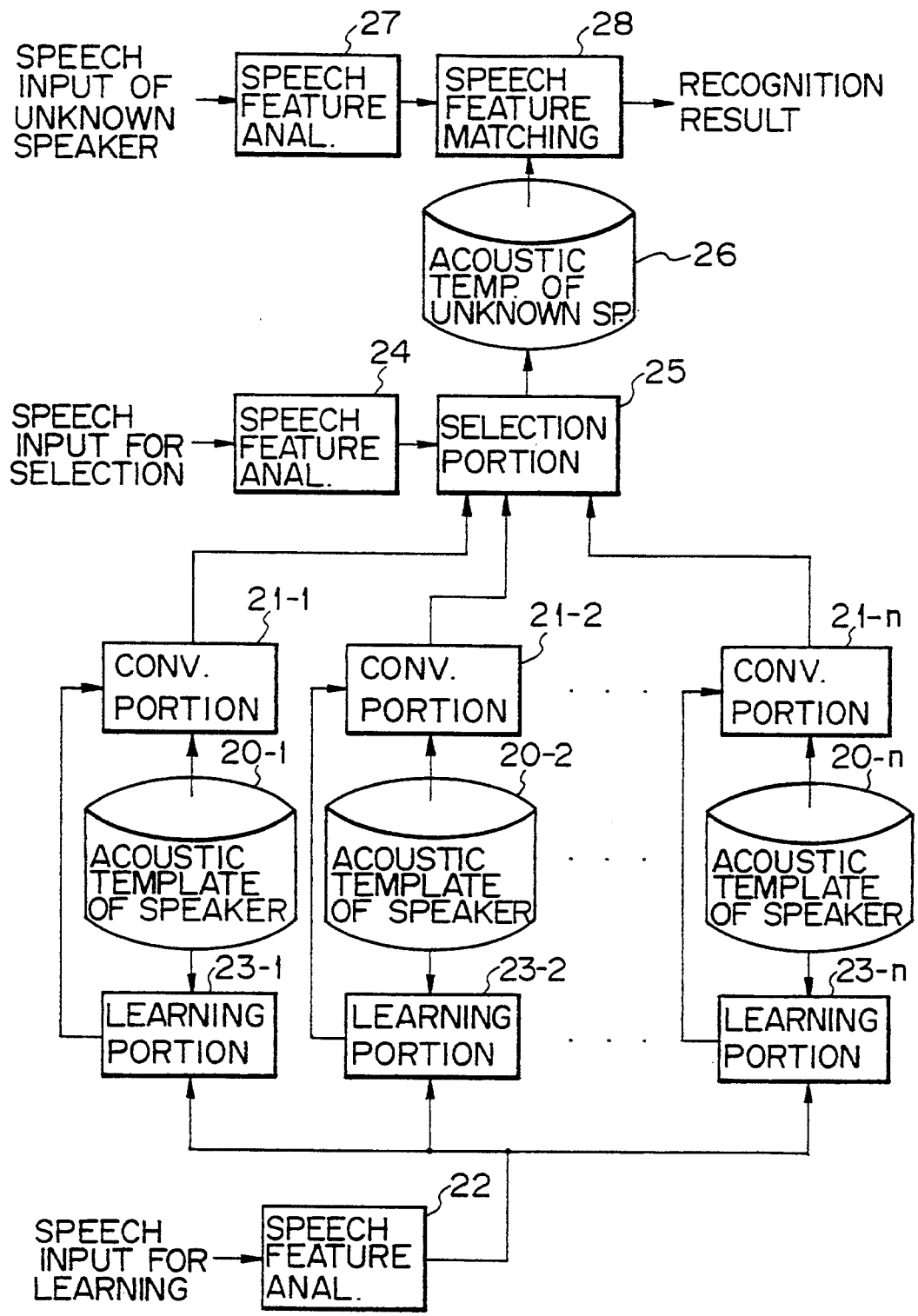
FIG. 3 is a schematic block diagram illustrating the summary of one embodiment of a speaker adapted speech recognition system of the present invention.

Referring now to FIG. 3, there is illustrated a summary of one embodiment of a speaker adapted speech recognition system according to the present invention. In FIG. 3, elements $2o-i$ ($i=1$ to n) denote a plurality of acoustic templates of a plurality of mutually different speakers. Each acoustic template $20-i$ is adapted to manage correspondence between an acoustic feature of the speech and the content of speech. Element $21-i$ ($i=1$ to n) denote converting portions (CONV. PORTION) provided corresponding to the acoustic templates $20-i$. Each converting portion $21-i$ is adapted to convert the acoustic feature of the speech managed by the corresponding acoustic template $20-i$ according to a set parameter. Element 22 denotes a speech feature analyzing portion (SPEECH FEATURE ANAL.) for deriving the acoustic feature of the speech input for learning when the speech input for learning is provided. Element $23-i$ ($i=1$ to n) denote a learning portion provided corresponding to the acoustic templates $20-i$, for example. The learning portion $23-i$ learns the parameter of the converting portion $21-i$ so that the acoustic feature of the acoustic template $20-i$ to be converted by the converting portion $21-i$ may be approximately coincident with the acoustic feature of the corresponding speech input for learning derived by the speech feature analyzing portion 22, and sets in the converting portion $21-i$.

Element 24 denotes a speech feature analyzing portion (SPEECH FEATURE ANAL.) for deriving the acoustic feature of the speech input for selection. Element 25 denotes a selection portion for comparing the acoustic feature of the speech input for selection derived by the speech feature analyzing portion 24 and the corresponding acoustic feature converted by the converting portion $21-i$, selecting one or more of the acoustic templates $20-i$ having acoustic features similar to the acoustic feature of the speech input for selection. Element 26 denotes an acoustic template for the unknown speaker (ACOUSTIC TEMP. OF UNKNOWN SP.), that stores the management data of the acoustic template $20-i$ converted by the converting portion $21-i$ selected by the selection portion 25, as the acoustic template for the unknown speaker. Element 27 denotes a speech feature analyzing portion (SPEECH FEATURE ANAL.) that derives the acoustic feature of the speech input of the unknown speaker when the speech input of the unknown speaker is provided. Element 28 is a speech feature matching portion (SPEECH FEATURE MATCHING) for checking the matching of the acoustic feature derived by the acoustic feature analyzing portion 27 and the acoustic feature stored in the template 26 of the unknown speaker to recognize the content of the speech of the speech input of the unknown speaker.

In such a construction, the converting portion $21-i$ performs a converting process according to a parameter that is set for a respective acoustic attribute, such as a voiced sound, or an unvoiced sound. The learning portion $23-i$ may have the construction to learn the parameters for respective acoustic attributes set by the converting portion $21-i$. With such a construction, a high precision level of a recognition process adapted to the acoustic attribute becomes possible. On the other hand, the converting portion $21-i$ performs a conversion process according to a linear conversion process. Corresponding to such a conversion process, the learning portion $23-i$ may be constructed to perform a learning of the parameters of the linear conversion process according to linear regression analysis. As an alternative, the converting portion $21-i$ may be constructed to have basic units, each of which is adapted to receive one or more inputs and an internal value to be multiplied with these inputs to obtain a multiplication and addition value and to obtain a final output by converting the multiplication and addition value with a defined function. The basic units are connected by a network connection to perform a conversion process by taking the internal values as parameters. Corresponding to such a conversion process, the learning portion $23-i$ can be constructed to learn the internal value. As speech input for selection to be input to the speech feature analyzing portion 24, it is possible to employ the speech input for learning to be input to the speech feature analyzing portion 22. By such a construction, the input process of the speech input for selection can be abbreviated.

In the construction of the present invention as set forth above, the unknown speaker initially inputs the speech input for learning to the speech feature analyzing portion 22. Once the speech input for learning is provided, the speech feature analyzing portion 22 derives the acoustic feature of the speech input for learning. In response to a derivation process, when the converting portion 21-*i* is formed for example, as the hierarchic network of the above-mentioned basic units, respective learning portion 23-*i* studies the parameter of the converting portion 21-*i* according to a back propagation method so that the acoustic feature of the acoustic template 20-*i* of the speaker that is converted by the converting portion 21-*i* is approximately coincident with the acoustic feature of the corresponding speech input for learning derived by the speech feature analyzing portion 22. The converting portion 21-*i* is responsive to this learning process to convert the acoustic feature managed by the corresponding acoustic template 20-*i* with the learned parameter. On the other hand, when the converting portion 21-*i* is adapted to perform a conversion process according to the linear conversion process, the learning portion 23-*i* learns the parameter of the linear conversion process according to a linear regression analysis so that the acoustic feature of the acoustic template 20-*i* converted by the converting portion 21-*i* becomes approximately coincident with the acoustic feature of the corresponding speech input for learning derived by the speech feature analyzing portion 22. In response to this learning process, the converting portion 21-*i* performs a conversion of the acoustic feature managed by the corresponding acoustic template 20-*i* according to the learned parameter.

Next, the unknown speaker inputs the speech input for selection to the speech feature analyzing portion 24. Once the speech input for selection is provided, the speech feature analyzing portion 24 derives the acoustic feature of the speech input for selection. In response to this derivation process, the selection portion 25 compares the derived acoustic feature with the corresponding acoustic feature to be converted by the conversion portion 21-*i* to select the acoustic template 20-*i* having the acoustic feature converted by the conversion portion 21-*i*, similar to the acoustic feature of the speech input for selection. The management data of the acoustic template converted by the conversion portion 21-*i* is stored in the template 26 of the unknown speaker.

Subsequently, the unknown speaker inputs the speech to the speech feature analyzing portion 27. Once the speech input of the unknown speaker is provided, the speech feature analyzing portion 27 derives the acoustic feature of the speech input of the unknown speaker. In response to a derivation process, the speech feature matching portion 28 checks a matching of the derived acoustic feature and the acoustic feature stored in the template 26 of the unknown speaker to recognize the content of the speech input of the unknown speaker.

As set forth above, according to this embodiment, a plurality of acoustic templates 20-*i* are prepared. Also, the converting portions 21-*i* for converting the management data of the acoustic template 20-*i* and the learning portion 23-*i* for learning the data converting function of the converting portion 21-*i* in response to an input of the speech input for learning are provided so that the management data of respective acoustic templates 20-*i* are converted to be similar to the speech characteristics of the unknown speaker. Among the converted management data of the acoustic templates 20-*i*, the most similar template is selected for recognition of speech of the unknown speaker. By this arrangement, speech recognition of speakers independent speech recognition is performed. Therefore, a high speech recognition rate for the unknown speaker can be attained without expanding the scale of the converting portion 21-*i*.

The preferred embodiments for implementing the present invention as set forth above will be discussed hereinbelow with reference to FIGS. 4 to 7.

Figure 4A:
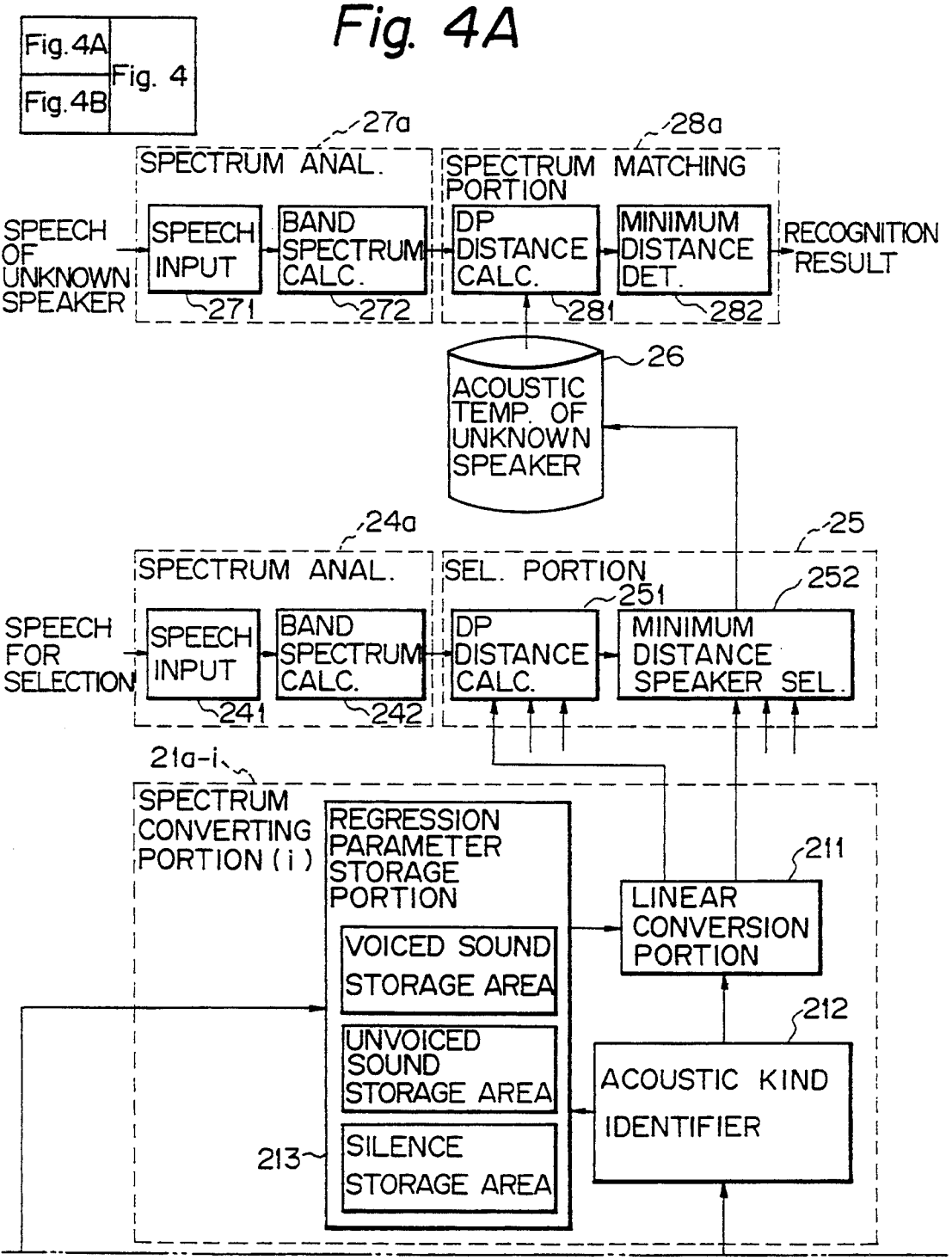
FIG. 4A and FIG. 4B, is a block diagram of one embodiment of a speaker adapted speech recognition system according to the present invention.
Figure 4B:
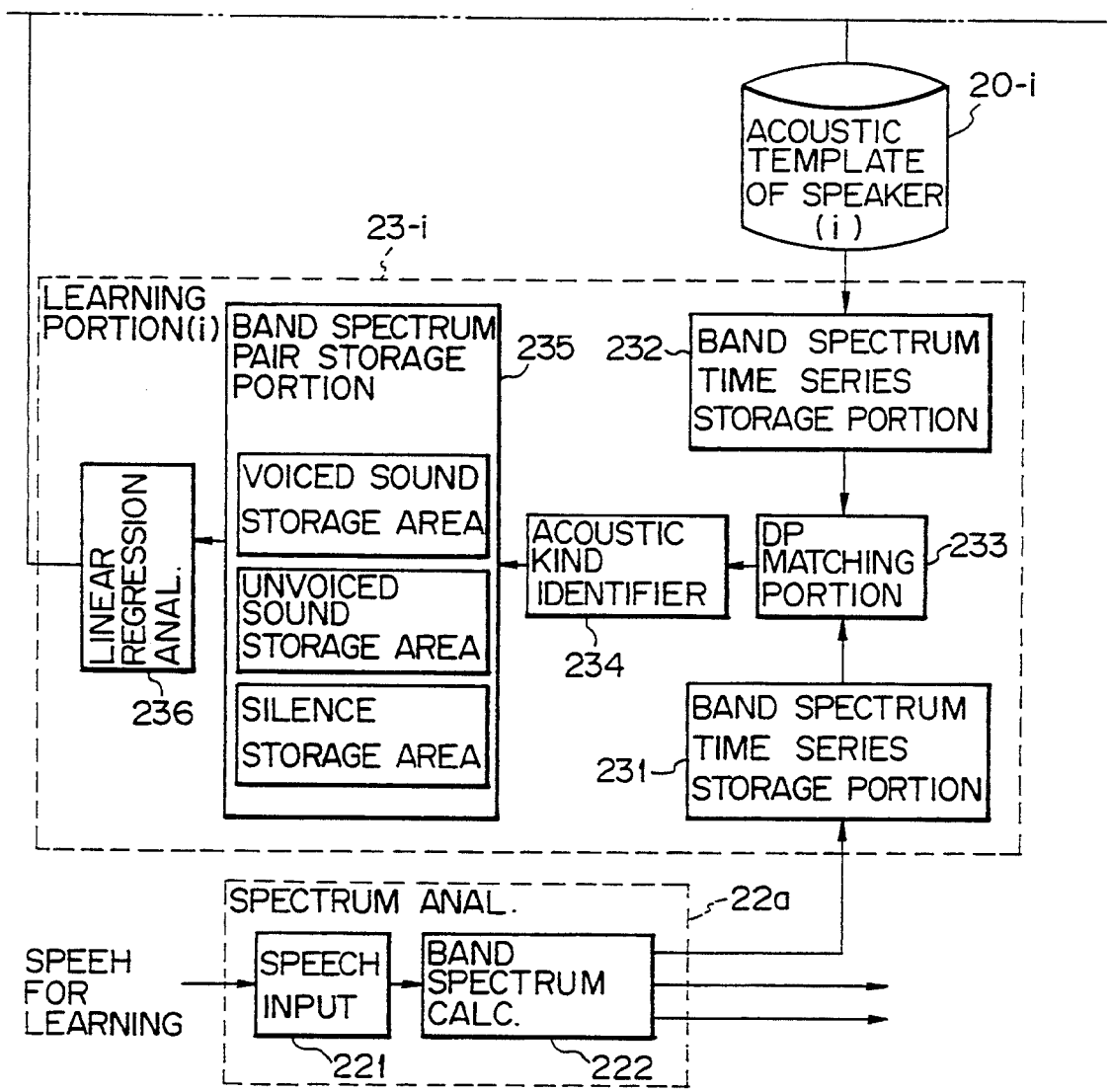

FIG. 4 comprising FIG. 4A and FIG. 4B shows one embodiment of the speaker adapted speech recognition system according to the present invention. In the drawings, the elements common to those of FIG. 3 are represented by the same reference numerals. The shown embodiment employs a spectral pattern as the acoustic feature discussed with respect to FIG. 3. As can be seen, in the shown embodiment, the converting portion 21-*i*, the speech feature analyzing portion 22, the speech feature analyzing portion 24, the speech feature analyzing portion 27, the speech feature matching portion 28 are illustrated as spectrum converting portions 21*a*–*i*, a spectrum analyzing portion (SPECTRUM ANAL.) 22*a*, a spectrum analyzing portion 24*a* (SPECTRUM ANAL.), a spectrum analyzing portion (SPECTRUM ANAL.) 27*a* and a spectrum matching portion 28*a*.

Next, respective components provided in each function portion in the embodiment of FIG. 4 will be discussed.

The spectrum conversion portion 21*a*–*i* comprises a linear conversion portion 211 for performing linear conversion for a time series data (spectral pattern) of a band spectrum read out from the acoustic template 20-*i*, with a regression parameter as a linear coefficient, an acoustic kind identifier 212 for discriminating band spectrum at respective timings of the time series data of the band spectrum read out from the acoustic template between voiced sound, unvoiced sound and silence, a regression parameter storage portion 213 for managing regression parameter set for respective voiced sound, the unvoiced sound and silence and selectively providing the acoustic kind of regression parameter to the linear conversion portion 211. Namely, the spectrum converting portion 21*a*–*i* performs a conversion process for deriving values y1 to ym of respective bands of the band spectrum after conversion according to the following equation, based on the values x1 to xm of respective bands of the band spectrum stored in the acoustic template 20-*i* and the regression parameters a0 to am set corresponding to the acoustic kinds.

$$y1 = a0 + a1 \cdot x1 + a2 \cdot x2 + \ldots + am \cdot xm \, (1 \leq i \leq m)$$

The spectrum analyzing portion 22*a* includes a speech input portion (SPEECH INPUT) 221 for performing input processing of the speech for learning and a band spectrum calculating portion (BAND SPECTRUM CALC.) 222 for calculating the time series data of the band spectrum of the speech for learning input through the speech input portion 221.

The learning portion 23-*i* comprises a band spectrum time series storage portion 231 for storing the time series data of the band spectrum derived by the band spectrum calculating portion 222, a band spectrum time series storage portion 232 for developing a time series data of a band spectrum of the acoustic template 20-*i* correlated with the time series data of the band spectrum stored in the band spectrum time sequence storage portion 231, a DP (dynamic programming) matching portion 233 performing a DP matching process of the time series data of the band spectrums stored in two band spectrum time series storage portions 231 and 232 and compressing and expanding time axes of these two time series data of the band spectrums for correlation thereof, an acoustic kind identifier 234 for discriminating the band spectrum at respective timings of a pair of the time series data of the band spectrum correlated by the DP matching portion 233 between the voiced sound, the unvoiced sound and the silence, a band spectrum pair storage portion 235 for storing a pair of band spectrums correlated by the DP matching portion 233 respectively for the voiced sound, the unvoiced sound and the silence and a linear regression analyzing portion (LINEAR REGRESSION ANAL.) 236 for calculating the correspondence of a pair of the band spectrum stored in the band spectrum pair storage portion 235 according to the linear regression analysis, as a regression parameter and for storing in a managing area corresponding to the regression parameter storage portion 213. Namely, the learning portion 23-$i$ derives the regression parameter so that the time series data of the band spectrum stored in the acoustic template 20-$i$ can be converted into the time series data of the band spectrum of the speech for learning, and set in the spectrum converting portion 21$a$-$i$.

The spectrum analyzing portion (SPECTRUM ANAL.) 24$a$ includes a speech input portion (SPEECH INPUT) 241 for performing an input process of the speech for selection, and a band spectrum calculating portion (BAND SPECTRUM CALC.) 242 for calculating the time series data of the band spectrum of the speech for selection input from the speech input portion.

The selection portion 25 includes a DP distance calculating portion (DP DISTANCE CALC.) 251 for deriving a distance between the time series data of the band spectrum derived by the band spectrum calculating portion 242 and the corresponding time series data of the band spectrum of each acoustic template 20-$i$ converted by the linear conversion portion 211, in accordance with the DP matching processing, and a minimum distance speaker selecting portion (MINIMUM DISTANCE SPEAKER SEL.) 252 for identifying the acoustic template 20-$i$ having the minimum distance among the distances calculated by the DP distance calculating portion 251 and storing the time series data of the band spectrum of the acoustic template 20-$i$ converted by the spectrum converting portion 21$a$-$i$ in the template 26 for the unknown speaker.

The spectrum analyzing portion 27$a$ includes a speech input portion (SPEECH INPUT) 271 for performing an input process of speech of the unknown speaker as vocabulary, and a band spectrum calculating portion (BAND SPECTRUM CALC.) 272 for calculating the time series data of the band spectrum of the speech of the unknown speaker input from the speech input portion (SPEECH INPUT) 271.

The spectrum matching portion 28$a$ includes a DP distance calculating portion (DP DISTANCE CALC.) 281 for deriving the distance between the time series data of the band spectrum calculated by the band spectrum calculating portion 272 and the time series data of the band spectrums stored in the acoustic template 26 for the unknown speaker in accordance with the DP matching process and a minimum distance detecting portion (MINIMUM DISTANCE DET.) 282 for identifying the time series data of the band spectrum having the minimum distance among the distances derived by the DP distance calculating portion 281 and outputting a character string correlated to the identified time series data of the band spectrum as a result of speech recognition.

Next, the speech recognition process to be implemented by the shown embodiment constructed as set forth above will be discussed.

The unknown speaker to be a subject of speech recognition initially inputs the speech, for learning, to the speech input portion 22. In response to an input of the speech for learning, the band spectrum calculating portion 222 calculates the time series data of the band spectrum of the speech for learning to store in the band spectrum time series storage portion 231. When the time series data of the band spectrum of the speech for learning is stored in the band spectrum time sequence storage portion 231, the DP matching portion 233 performs a correlation of the time series data of the band spectrum stored in the band spectrum time series storage portion 231 and the corresponding time series data of the band spectrum stored in the acoustic template 20-$i$ through DP matching. The acoustic kind identifier 234 discriminates the acoustics of a correlated pair of band spectrums. According to the result of the discrimination, the correlated pair of band spectrums are stored in the corresponding management area of the band spectrum pair storage portion 235.

Once the band spectrum pair is stored in the band spectrum pair storage portion 235, the linear regression analyzing portion 236 derives the correspondence of the band spectrum pair stored in the band spectrum pair storage portion 235 as the regression parameter according to the linear regression analysis and stores same in the corresponding management area of the regression parameter storage portion 213. In response to a storing process of the regression parameter, the linear conversion portion 211 reads out the time series data of the band spectrum from the acoustic template 20-$i$ and then performs a linear conversion of the read out time series data of the band spectrum using the regression parameter provided according to the process of the acoustic kind identifier 212.

Thus, the spectrum converting portion 21$a$-$i$ performs a linear conversion to modify the time series data of the spectrum stored in the acoustic template 20-$i$ to be similar to that of the speech for learning.

Next, the unknown speaker inputs the speech for selection to the speech input portion 241. In response to an input to the speech for selection, the band spectrum calculating portion 242 calculates the time series data of the band spectrum of the speech for selection. In response to this, the DP distance calculating portion 251 derives the distances between the derived time series data of the band spectrum of the speech for selection and the time series data of the corresponding band spectrum of the acoustic template 20-$i$, which is converted by the linear conversion portion 211. In response to this calculation process, the minimum distance speaker selecting portion 252 identifies the acoustic template 20-$i$ having the minimum distance among the distances derived and stores the time series data of the band spectrum of the relevant acoustic template 20-$i$, which is converted by the spectrum converting portion 21$a$-$i$, in the template 26 for the unknown speaker.

As set forth above, the selection portion 25 creates a template 26 for the unknown speaker having similar speech characteristics of the unknown speaker.

Subsequently, the unknown speaker inputs the speech of the unknown speaker as vocabulary to the speech input portion 271. In response to an input of the speech of the unknown speaker, the band spectrum calculating portion 272 calculates the time series data of the band spectrum of the speech of the unknown speaker. In response to the calculation process, the DP distance calculating portion 281 derives the distances between the time series data of the band spectrum of the derived speech of the unknown speaker and the time series data of respective band spectrums stored in the template 26 for the unknown speaker. In response to this calculation process, the minimum distance detecting portion 282 identifies the time series data of the band spectrum having the minimum distance among the derived distances and outputs the character string associated with the identified time series data of the spectrum, as a result of the speech recognition.

Thus, the spectrum matching portion 28a performs the speech recognition process of the speech of the unknown speaker employing the template 26 for the unknown speaker created with a similar configuration to the speaker characteristics of the unknown speaker.

As set forth above, according to the present invention, a plurality of acoustic templates 20-i of the speakers are provided and the management data of those acoustic templates 20-i are converted to be similar to the speech for learning so that the speech recognition process can be performed with the management data of the acoustic template 20-i that is the closest to the speaker characteristics of that of the unknown speaker. Therefore, it becomes possible to attain a high recognition rate for the unknown speaker.

Figure 5B:
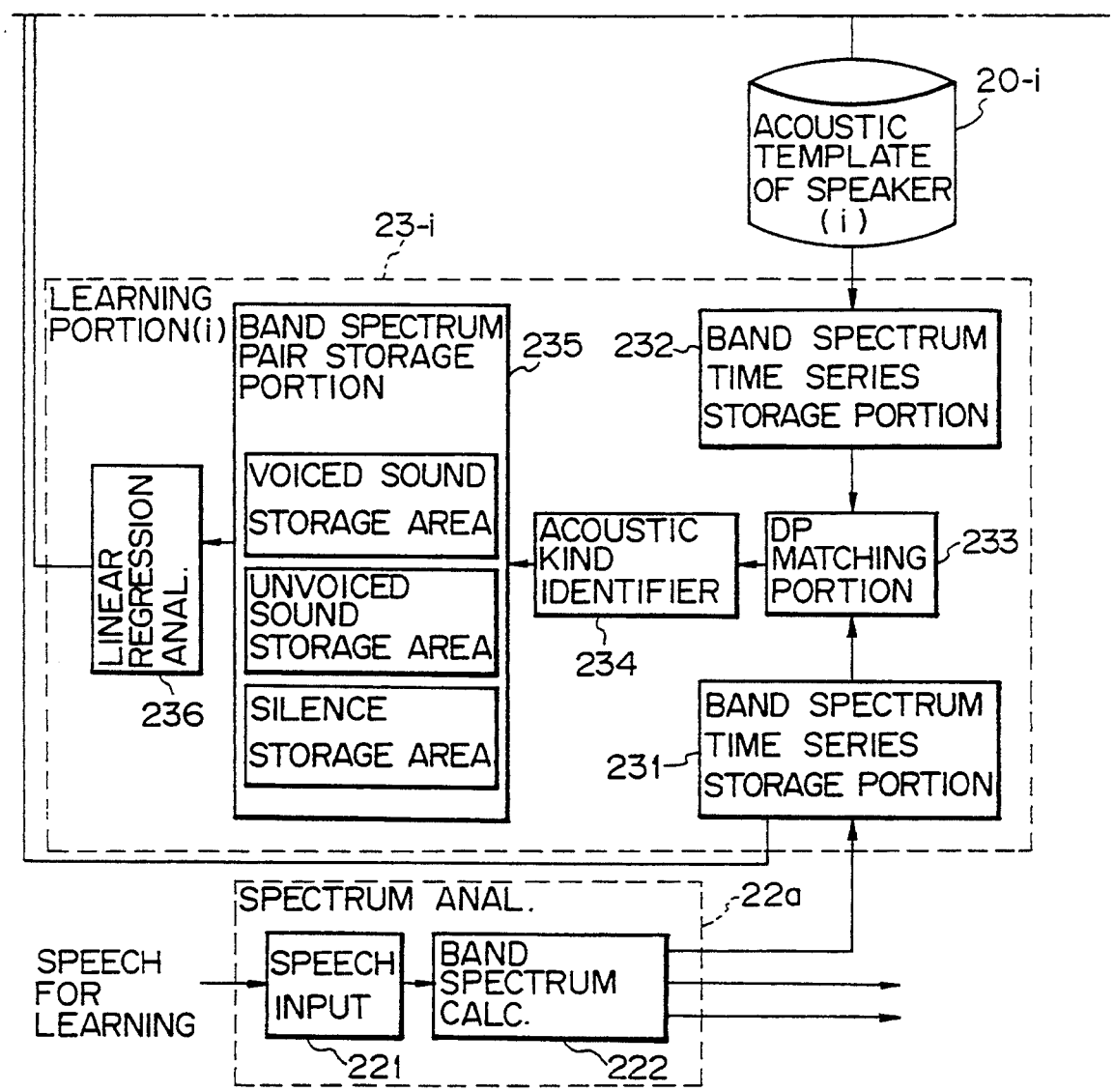
Figure 6A:
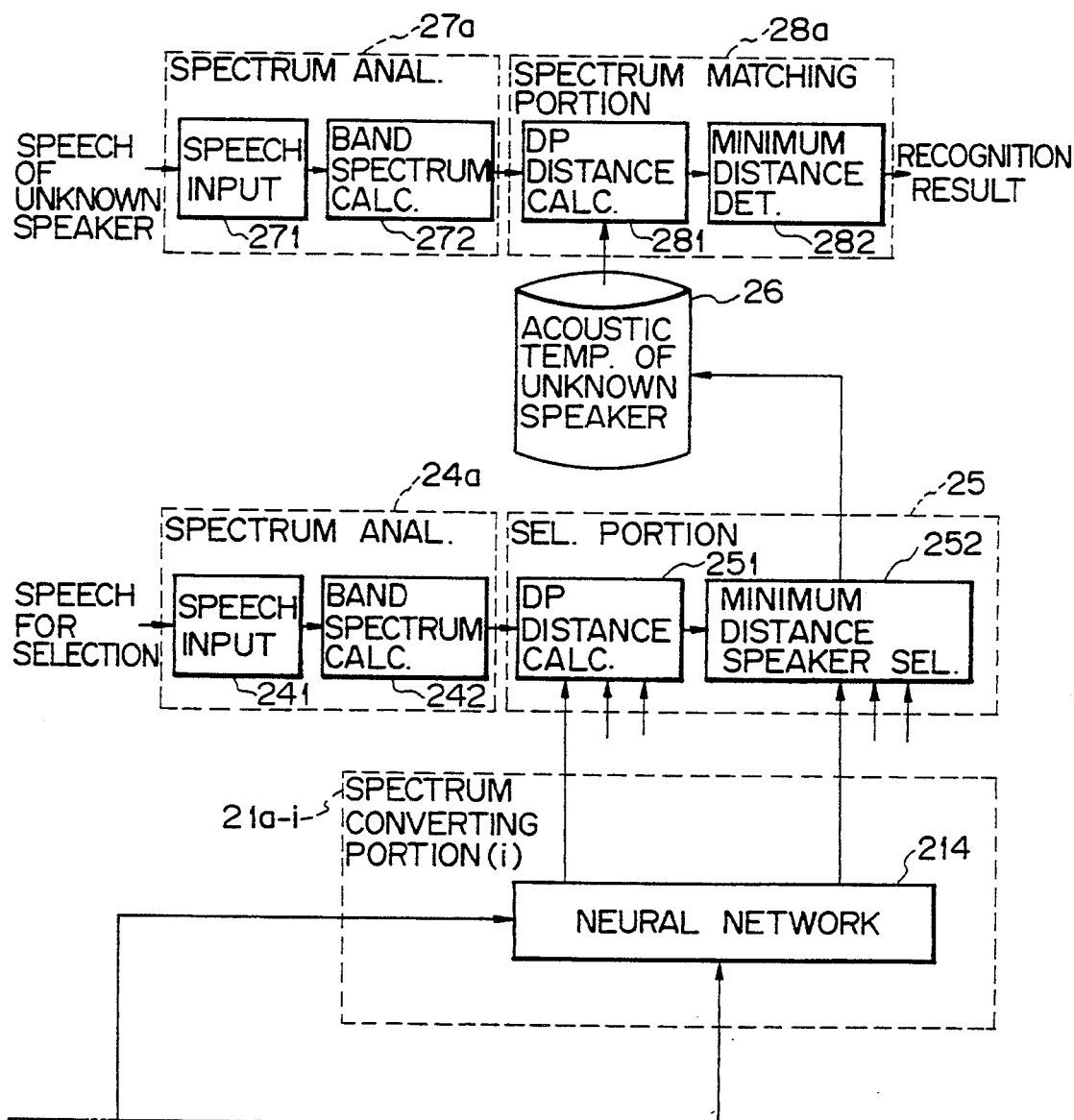
FIG. 6A and FIG. 6B, is a block diagram of a further embodiment of a speaker adapted speech recognition system according to the present invention.
Figure 6B:
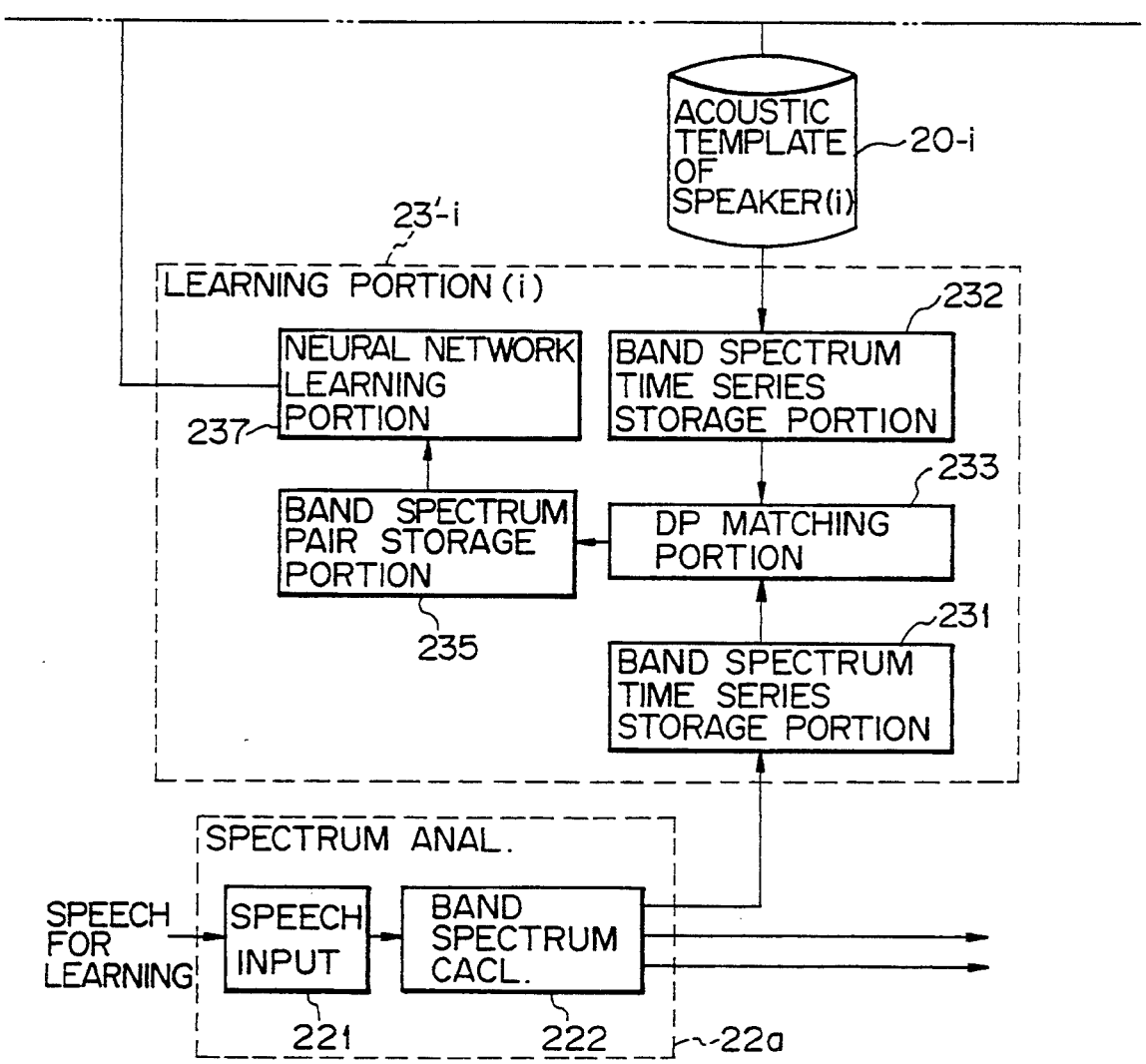
Figure 7:
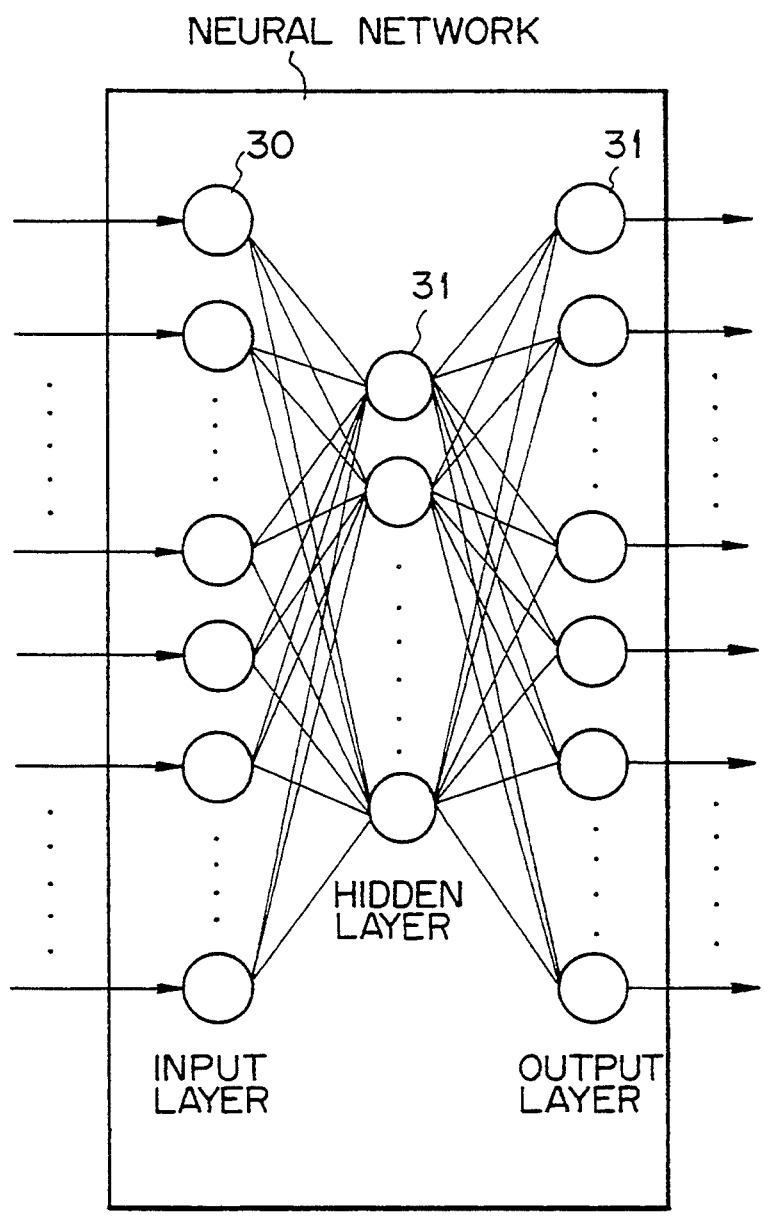
FIG. 7 is an explanatory illustration showing one embodiment of a neural network to be employed in the speaker adapted speech recognition system according to the invention.

FIGS. 5 comprising FIG. 5A and FIG. 5B and FIG. 6 comprising FIG. 6A and FIG. 6B show another embodiment of the present invention. Here, the components common to the foregoing embodiment of FIG. 4 will be represented by the same reference numerals.

The embodiment of FIG. 5 is adapted to use the time series data of the band spectrum of the speech for learning stored in the band spectrum time series storage portion 231 as the speech for selection. By using the time series data of the band spectrum of the speech for learning as the time series data of the band spectrum of the speech for selection, the spectrum analyzing portion 24a, which is required in the embodiment of FIG. 4, becomes unnecessary in the shown embodiment of FIG. 5.

On the other hand, the embodiment of FIG. 6 is adapted to employ a neural network 214 as the spectrum converting portion 21a-i. The neural network 214 comprises, for example, an input layer formed by a plurality of input units 30 that receive the time series data of the band spectrum read out from the acoustic template 20-i for distribution, a hidden layer formed by a plurality of basic units 31 that obtain a multiplication and addition value by receiving one or more inputs from the input layer and a weighting value to be multiplied with those inputs to obtain the final output by converting the multiplication and addition value with a predetermined defined function, and an output layer following the hidden layer, formed by a plurality of basic units obtaining a multiplication and addition value by receiving one or more inputs from the hidden layer and a weighting value to be multiplied with those inputs and obtaining the final output by converting the multiplication and addition value with a predetermined defined function to output the series time series data of the band spectrum.

This neural network 214 varies the data converting function depending upon the weighting value assigned between respective units. The learning portion 23'-i includes a neural network learning portion 237 for performing a learning process of the weighting values so that when the band spectrum stored in the acoustic templates 20-i are provided for the input layer of the neural network 214, the weighting value, at which the band spectrum corresponding to the speech for learning stored in the band spectrum storage portion 235 is output from the output layer, is learned.

As set forth above, according to the present invention, since a plurality of acoustic templates for the speakers are prepared, the management data of those acoustic templates are converted to be similar to the speech for learning, and the speech recognition process is performed employing the most similar converted management data of the acoustic templates to the speaker characteristics of the unknown speaker, and it becomes possible to realize a high recognition rate in the speech recognition process for the unknown speaker.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but includes all possible embodiments that can be within a scope encompassed and equivalents thereof with respect to the feature set out in the appended claims.

We claim:

1. A speaker adapted speech recognition system, for recognizing speech, comprising acoustic attributes, of an unknown speaker, the speaker adapted speech recognition system comprising:

acoustic templates, each acoustic template having an acoustic feature of speech and corresponding to a speaker, managing correspondence between the acoustic feature of the speech and a content of the speech;

converting portions, each converting portion coupled to a respective one of the acoustic templates, converting the acoustic feature of the speech managed by said acoustic templates according to a parameter set for a respective acoustic attribute;

learning portions, each learning portion respectively coupled to one of the converting portions and one of the acoustic templates, learning said parameter and at which the acoustic features of said acoustic templates as converted by said respective converting portion are approximately coincident with the acoustic feature of corresponding speech input for learning; and a selection portion coupled to the converting portions and selecting at least one of said acoustic templates having acoustic features closest to the acoustic features of speech input for selection, wherein the acoustic features of the acoustic templates are converted by said converting portions by comparing the corresponding acoustic feature of the speech input for selection with the corresponding acoustic features of the acoustic templates converted by said converting portions, and an acoustic template for the unknown speaker is created, forming a created acoustic template, by converting the acoustic features of the acoustic templates that are selected by the selection portion, by said converting portions, to recognize the content of the speech input of the unknown speaker by using the created acoustic template of the speaker.

2. A speaker adapted speech recognition system as set forth in claim 1, wherein each of said converting portions performs a converting process according to parameters set with respect to respective attributes of the speech; and each of said learning portions is adapted to learn the parameters for respective attributes of the speech set by the respective converting portion.

3. A speaker adapted speech recognition system as set forth in claim 2, wherein each of said converting portions performs the linear conversion; and each of said learning portions learns said parameters of said linear converting process according to a linear regression analysis.

4. A speaker adapted speech recognition system as set forth in claim 3, wherein said speech input for learning is used as the speech input for selection.

5. A speaker adapted speech recognition system as set forth in claim 2, wherein each of said converting portions has basic units as basic components, receiving one or more inputs and an internal value to be multiplied with said inputs to derive said multiplication and addition value, converting said multiplication and addition value with a defined function to derive a final output;

said basic units being connected through a network connection to perform a conversion process with said interval value as the parameter; and said learning portion performs a process for learning of said internal value.

6. A speaker adapted speech recognition system as set forth in claim 5, wherein said speech input for learning is used as the speech input for selection.

7. A speaker adapted speech recognition system as set forth in claim 2, wherein said speech input for learning is used as the speech input for selection.

8. A speaker adapted speech recognition system as set forth in claim 1, wherein each of said converting portions performs the linear conversion; and each of said learning portions learns said parameters of said linear converting process according to a linear regression analysis.

9. A speaker adapted speech recognition system as set forth in claim 8, wherein said speech input for learning is used as the speech input for selection.

10. A speaker adapted speech recognition system as set forth in claim 1, wherein each of said converting portions has basic units as basic components, receiving one or more inputs and an internal value to be multiplied with said inputs to derive said multiplication and addition value with a defined function to derive a final output;

said basic units being connected through a network connection to perform a conversion process with said interval value as the parameter; and each of said learning portions performs a process for learning of said internal value.

11. A speaker adapted speech recognition system as set forth in claim 10, wherein said speech input for learning is used as the speech input for selection.

12. A speaker adapted speech recognition system as set forth in claim 1, wherein said speech input for learning is used as the speech input for selection.

* * * * *

UNITED STATES PATENT AND TRADEMARK OFFICE
CERTIFICATE OF CORRECTION

PATENT NO.   :  5,375,173
DATED        :  December 20, 1994
INVENTOR(S)  :  Toru SANADA et al.

It is certified that error appears in the above-indentified patent and that said Letters Patent is hereby corrected as shown below:

Col. 1, Line 16, delete "," after "recognition".

Col. 8, Line 49, change " $(1 \leq ; \leq m)$ " to $(1 \leq i \leq m)$.

Signed and Sealed this

Twenty-seventh Day of June, 1995

Attest:

BRUCE LEHMAN

*Attesting Officer*    *Commissioner of Patents and Trademarks*